US008772365B2

(12) United States Patent
Kajihara et al.

(10) Patent No.: US 8,772,365 B2
(45) Date of Patent: Jul. 8, 2014

(54) RESIN COMPOSITION FOR FOAMS AND USES THEREOF

(75) Inventors: Takayuki Kajihara, Funabashi (JP); Eiji Shiba, Ichihara (JP); Masayoshi Yamaguchi, Chiba (JP); Kiminori Noda, Mobara (JP)

(73) Assignee: Mitsui Chemicals, Inc., Tokyo (JP)

( * ) Notice: Subject to any disclaimer, the term of this patent is extended or adjusted under 35 U.S.C. 154(b) by 512 days.

(21) Appl. No.: 11/920,505

(22) PCT Filed: May 17, 2006

(86) PCT No.: PCT/JP2006/309784
§ 371 (c)(1),
(2), (4) Date: Nov. 16, 2007

(87) PCT Pub. No.: WO2006/123670
PCT Pub. Date: Nov. 23, 2006

(65) Prior Publication Data
US 2009/0100704 A1    Apr. 23, 2009

(30) Foreign Application Priority Data

May 19, 2005    (JP) .................................. 2005-147316

(51) Int. Cl.
*C08J 9/00* (2006.01)
*C08L 23/08* (2006.01)

(52) U.S. Cl.
CPC ............... *C08J 9/0061* (2013.01); *C08L 23/08* (2013.01); *C08J 2323/04* (2013.01); *C08J 2353/02* (2013.01); *C08J 2423/00* (2013.01)
USPC ........... 521/134; 521/139; 521/140; 521/142; 521/146; 521/148

(58) Field of Classification Search
USPC ................. 521/134, 139, 140, 142, 146, 148; 525/98, 192.194
See application file for complete search history.

(56) References Cited

U.S. PATENT DOCUMENTS

| 2,241,239 | A | 5/1941 | Carroll et al. | |
|---|---|---|---|---|
| 5,407,965 | A | 4/1995 | Park et al. | |
| 5,527,753 | A | 6/1996 | Engel et al. | |
| 5,708,092 | A | 1/1998 | Schwindeman et al. | |
| 2005/0119414 | A1* | 6/2005 | Sasagawa et al. | 525/242 |
| 2005/0154100 | A1 | 7/2005 | Kosaka et al. | |
| 2006/0154998 | A1* | 7/2006 | Shiba et al. | 521/142 |

FOREIGN PATENT DOCUMENTS

| EP | 1 312 640 A1 | 5/2003 |
|---|---|---|
| JP | 62-121709 A | 6/1987 |
| JP | 1-037970 B2 | 8/1989 |
| JP | 1-053851 B2 | 11/1989 |
| JP | 2-009041 B2 | 2/1990 |
| JP | 8-109219 A | 4/1996 |
| JP | 9-501447 | 2/1997 |
| JP | 11-206406 | 8/1999 |
| JP | 11-206406 A | 8/1999 |
| JP | 2003-277539 | 10/2003 |
| JP | 2003-277539 A | 10/2003 |
| JP | 2004-059741 | 2/2004 |
| JP | 2004-331707 A | 11/2004 |
| JP | 2006-150830 A | 6/2006 |
| WO | WO 03/035705 A1 | 5/2003 |
| WO | WO 03/074574 A1 | 9/2003 |
| WO | WO 2004/003027 A1 | 1/2004 |
| WO | WO 2005/000958 A1 | 1/2005 |

OTHER PUBLICATIONS

Asahi Kasei Corporation, Press Release, "Commercialization of new polymer as flexible PVC substitute", Jul. 17, 2002 (http://www.asahi-kasei.co.jp/asahi/en/news).
Lindeman, et al., "Carbon-13 Nuclear Magnetic Resonance Spectrometry", Analytical Chemistry, vol. 43, No. 10, pp. 1245-1252, Aug. 1971.
Randall, James C., "A Review of High Resolution Liquid $^{13}$Carbon Nuclear Magnetic Resonance Characterizations of Ethylene-Based Polymers", Journal of Macromolecular Science—Reviews in Macromolecular Chemistry and Physics, vol. C29, Nos. 2 & 3, pp. 201-317, 1989.
Hsieh, Eric T. et al., "Ethylene-1-Butene Copolymers. 1. Comonomer Sequence Distribution", Macromolecules, vol. 15, No. 2, pp. 353-360, Mar.—Apr. 1982.
Ray, G. Joseph et al., "Carbon-13 Nuclear Magnetic Resonance Determination of Monomer Composition and Sequence Distributions in Ethylene-Propylene Copolymers Prepared with a Stereoregular Catalyst System", Macromolecules, vol. 10, No. 4, pp. 773-778, Jul.—Aug. 1977.
Kolthoff, I. M. et al., "Determination of Polystyrene in GR-S-Rubber", Journal of Polymer Science, vol. 1, No. 5, pp. 429-433, Oct. 1946.
Japanese Office Action for Application No. 2007-516304 dated Sep. 4, 2012, 2 pages.

\* cited by examiner

*Primary Examiner* — Irina S Zemel
(74) *Attorney, Agent, or Firm* — Foley & Lardner LLP

(57) ABSTRACT

The present invention provides a resin composition capable of providing foams (non-crosslinked and crosslinked foams) which have low specific gravity and low compression set (CS) and are excellent in tensile strength properties, tear strength properties and vibration-damping properties at room temperature to high temperatures, and a foam of the resin composition. The resin composition for foams of the present invention comprises 5 to 95 parts by weight of an ethylene/α-olefin copolymer (A) and 5 to 95 parts by weight of a hydrogenated copolymer (B) obtained by hydrogenating a copolymer comprising a conjugated diene and a vinyl aromatic compound, and is characterized in that the hydrogenated copolymer (B) does not have a glass transition point of not higher than −10° C. when measured at a frequency of 1 Hz in accordance with JIS-K7198.

14 Claims, No Drawings

RESIN COMPOSITION FOR FOAMS AND USES THEREOF

TECHNICAL FIELD

The present invention relates to a resin composition for foams and uses thereof. More particularly, the present invention relates to a resin composition capable of providing foams (non-crosslinked and crosslinked foams) which have low specific gravity and low compression set (CS) and are excellent in tensile strength properties, tear strength properties and vibration-damping properties at room temperature to high temperatures, and a foam of the resin composition.

BACKGROUND ART

In order to obtain resins having low specific gravity, namely, light weight, and having flexibility and high mechanical strength, a technique of using crosslinked foams has been widely used for building interior and exterior materials, automobile parts, such as interior trim and door glass run, packaging materials, daily necessaries, etc. The reason is that since mere foaming of resins induces lowering of mechanical strength, molecular chains are bonded by the crosslinking reaction of the resins to make it possible to attain lightening due to foaming with inhibiting lowering of mechanical strength.

Also for footwear and footwear parts, such as shoe soles (mainly midsoles) of sport shoes, crosslinked foams of resins have been used, and the reason is that there have been desired materials which are lightweight, are inhibited from deformation due to long-term use and have mechanical strength to endure severe use conditions and vibration-damping properties to absorb impact in the landing.

For the shoe soles, a crosslinked foam of an ethylene/vinyl acetate copolymer has been heretofore used and widely known. The crosslinked foam obtained by molding a composition of the ethylene/vinyl acetate copolymer has a high specific gravity and a high compression set, and therefore, when it is used for shoe soles, there arise problems that the shoe soles are heavy and they are compressed by the long-term use and thereby lose mechanical strength.

In National Publication of International Patent No. 501447/1997 and Japanese Patent Laid-Open Publication No. 206406/1999, an invention relating to a crosslinked foam using an ethylene/α-olefin copolymer and an invention relating to a crosslinked foam using a mixture of an ethylene/vinyl acetate copolymer and an ethylene/α-olefin copolymer are described, respectively. In these inventions, the low specific gravity and the compression set properties have been improved, but satisfactory performance has not been obtained yet (patent documents 1 and 2).

In Japanese Patent Laid-Open Publication No. 277539/2003, an invention relating to a foam having excellent flexibility is described. The foam described in this invention, however, is inferior in vibration-damping properties in the temperature range in the vicinity of body temperature, in said temperature range shoe soles (mainly midsoles) of sport shoes being used, and is inferior in mechanical strength because the foam is attended with no crosslinking reaction. In WO2005/000958, an invention relating to a foam having excellent flexibility is described. However, further improvement in vibration-damping properties at room temperature to high temperatures has been desired (patent documents 3 and 4).

In order to solve the above problems, the present inventors have earnestly studied, and as a result, they have found that a foam of excellent vibration-damping properties is obtained by adopting a resin composition comprising an ethylene/α-olefin copolymer (A) and a hydrogenated copolymer (B) obtained by hydrogenating a copolymer comprising a conjugated diene and a vinyl aromatic compound, or further a resin composition comprising an ethylene/α-olefin copolymer (A), a hydrogenated copolymer (B) obtained by hydrogenating a copolymer comprising a conjugated diene and a vinyl aromatic compound, and a natural resin such as a rosin-based or terpene-based resin or a petroleum resin (C), or further a resin composition comprising an ethylene/α-olefin copolymer (A), a hydrogenated copolymer (B) obtained by hydrogenating a copolymer comprising a conjugated diene and a vinyl aromatic compound, a natural resin such as a rosin-based or terpene-based resin or a petroleum resin (C) and an ethylene/polar monomer copolymer (D). Based on the finding, the present invention has been accomplished.

Patent document 1: National Publication of International Patent No. 501447/1997

Patent document 2: Japanese Patent Laid-Open Publication No. 206406/1999

Patent document 3: Japanese Patent Laid-Open Publication No. 277539/2003

Patent document 4: International Patent Publication WO2005/00958

DISCLOSURE OF THE INVENTION

Problem to be Solved by the Invention

It is an object of the present invention to provide a resin composition capable of providing foams (non-crosslinked and crosslinked foams) which have low specific gravity and low compression set (CS) and are excellent in tensile strength properties, tear strength properties and vibration-damping properties at room temperature to high temperatures, a foam of the resin composition and a laminate using the foam.

Means to Solve the Problem

That is to say, the resin composition for foams of the present invention is such a compositions as described below.

(1) A resin composition for foams, comprising 5 to 95 parts by weight of an ethylene/α-olefin copolymer (A) and 5 to 95 parts by weight of a hydrogenated copolymer (B) obtained by hydrogenating a copolymer comprising a conjugated diene and a vinyl aromatic compound, wherein the hydrogenated copolymer (B) does not have a glass transition point of not higher than −10° C. when measured at a frequency of 1 Hz in accordance with JIS-K7198.

(2) The resin composition for foams as described in (1), which further comprises at least one resin (C) selected from the group consisting of rosin-based resins, terpene-based resins and petroleum resins, in an amount of 1 to 1900 parts by weight based on 100 parts by weight of the total of the ethylene/α-olefin copolymer (A) and the hydrogenated copolymer (B).

(3) The resin composition for foams as described in (2), wherein the resin (C) has a softening point, as measured by a ring and ball method, of 40 to 180° C.

(4) The resin composition for foams as described in any one of (1) to (3), which further comprises an ethylene/polar monomer copolymer (D) in an amount of 1 to 1900 parts by weight based on 100 parts by weight of the total of the ethylene/α-olefin copolymer (A) and the hydrogenated copolymer (B).

(5) The resin composition for foams as described in any one of (1) to (4), which further comprises a blowing agent (E).

(6) The resin composition for foams as described in any one of (1) to (5), wherein the ethylene/α-olefin copolymer (A) has the following properties:

the ethylene/α-olefin copolymer (A) is an ethylene/α-olefin copolymer comprising ethylene and an α-olefin of 3 to 20 carbon atoms and has a density (ASTM D1505, 23° C.) of 0.857 to 0.910 g/cm$^3$, a melt flow rate (MFR2) (ASTM D1238, load of 2.16 kg, 190° C.), as measured at 190° C. under a load of 2.16 kg, of 0.1 to 40 g/10 min and a molecular weight distribution index, Mw/Mn, as evaluated by a GPC method, of 1.5 to 3.0.

According to the present invention, further, the following foams (7) to (10) are provided.

(7) A foam obtained by heat-treating the resin composition of any one of (1) to (6).

(8) A foam obtained by subjecting the foam of (7) to secondary compression.

(9) The foam as described in (7) or (8), which has a peak temperature of tan δ, as determined in the dynamic viscoelasticity measurement, of 0 to 60° C.

(10) The foam as described in any one of (7) to (9), which has a gel content of not less than 70% and a specific gravity of not more than 0.6.

According to the present invention, the following laminate (11) is provided.

(11) A laminate having a layer comprising the foam of any one of (7) to (10) and a layer comprising at least one material selected from the group consisting of a polyolefin, a polyurethane, a rubber, a leather and a synthetic leather.

According to the present invention, the following footwear (12) is provided.

(12) Footwear comprising the foam of any one of (7) to (10) or the laminate of (11).

According to the present invention, further, the following footwear part (13) or (14) is provided.

(13) A footwear part comprising the foam of any one of (7) to (10) or the laminate of (11).

(14) The footwear part as described in (13), which is a midsole, an inner sole or a sole.

Effect of the Invention

The resin composition of the present invention can provide foams (non-crosslinked and crosslinked foams) which have low specific gravity and low compression set (CS) and are excellent in tensile strength properties, tear strength properties and vibration-damping properties at room temperature to high temperatures.

BEST MODE FOR CARRYING OUT THE INVENTION

The resin composition for foams according to the present invention and uses thereof are described in detail hereinafter.

The resin composition for foams according to the present invention, preferably the resin composition for crosslinked foams, comprises an ethylene/α-olefin copolymer (A) and a hydrogenated copolymer (B) obtained by hydrogenating a copolymer comprising a conjugated diene and a vinyl aromatic compound, preferably comprises an ethylene/α-olefin copolymer (A), a hydrogenated copolymer (B) obtained by hydrogenating a copolymer comprising a conjugated diene and a vinyl aromatic compound, and a natural resin such as a rosin-based or terpene-based resin or a petroleum resin (C), and more preferably comprises an ethylene/α-olefin copolymer (A), a hydrogenated copolymer (B) obtained by hydrogenating a copolymer comprising a conjugated diene and a vinyl aromatic compound, a natural resin such as a rosin-based or terpene-based resin or a petroleum resin (C) and an ethylene/polar monomer copolymer (D). The resin composition of the present invention further comprises a blowing agent (E), an organic peroxide (F), and a crosslinking assistant (G), when necessary. In general, the resin composition particularly preferably comprises an ethylene/α-olefin copolymer (A), a hydrogenated copolymer (B) obtained by hydrogenating a copolymer comprising a conjugated diene and a vinyl aromatic compound, a natural resin such as a rosin-based or terpene-based resin or a petroleum resin (C), an ethylene/polar monomer copolymer (D) and a blowing agent (E).

Although the foam of the present invention is obtained by foaming or crosslinking-foaming the above resin composition, a crosslinked foam is preferably employed. Examples of the crosslinking methods include thermal crosslinking and ionizing radiation crosslinking. In the case of the thermal crosslinking, it is preferable to add the organic peroxide (F) and the crosslinking assistant (G) to the resin composition. In the case of the ionizing radiation crosslinking, the crosslinking assistant is sometimes added.

Ethylene/α-Olefin Copolymer (A)

The ethylene/α-olefin copolymer (A) for use in the present invention is a non-crystalline or low-crystalline random or block copolymer comprising ethylene and an α-olefin of 3 to 20 carbon atoms, and is preferably a soft ethylene/α-olefin copolymer having a density (ASTM D 1505, 23° C.) of not less than 0.857 g/cm$^3$ and not more than 0.910 g/cm$^3$, preferably 0.860 to 0.905 g/cm$^3$, more preferably 0.880 to 0.905 g/cm$^3$, and a melt flow rate (MFR2; ASTM D1238, 190° C., load of 2.16 kg), of 0.1 to 40 g/10 min, preferably 0.5 to 20 g/10 min.

The α-olefin to be copolymerized with ethylene is an α-olefin of 3 to 20 carbon atoms, and examples thereof include propylene, 1-butene, 1-pentene, 1-hexene, 1-heptene, 1-octene, 1-nonene, 1-decene, 1-undecene, 1-dodecene, 1-hexadecene, 1-octadecene, 1-nonadecene, 1-eicosene and 4-methyl-1-pentene. Of these, preferable are α-olefins of 3 to 10 carbon atoms, and particularly preferable are propylene, 1-butene, 1-hexene and 1-octene. These α-olefins are used singly or in combination of two or more kinds.

The ethylene/α-olefin copolymer (A) desirably contains units derived from ethylene in amounts of 75 to 95% by mol and units derived from the α-olefin of 3 to 20 carbon atoms in amounts of 5 to 25% by mol. The total amount of ethylene and the α-olefin is 100% by mol.

In addition to the above units, the ethylene/α-olefin copolymer (A) may further comprise units derived from other polymerizable monomers within limits not detrimental to the object of the present invention.

Examples of the ethylene/α-olefin copolymers (A) include an ethylene/propylene copolymer, an ethylene/1-butene copolymer, an ethylene/propylene/1-butene copolymer, an ethylene/propylene/ethylidenenorbornene copolymer, an ethylene/1-hexene copolymer and an ethylene/1-octene copolymer. Of these, an ethylene/propylene copolymer, an ethylene/1-butene copolymer, an ethylene/1-hexene copolymer, an ethylene/1-octene copolymer, etc. are preferably employed, and an ethylene/1-butene copolymer is particularly preferably employed. Although these copolymers are random or block copolymers, they are preferably random copolymers.

The ethylene/α-olefin copolymer (A) has a crystallinity, as measured by X-ray diffractometry, of usually not more than 40%, preferably 5 to 30%.

The ethylene/α-olefin copolymer (A) desirably has a molecular weight distribution (Mw/Mn), as determined by gel permeation chromatography (GPC), of 1.5 to 3.0, preferably 1.7 to 2.5. When the ethylene/α-olefin copolymer (A) having a molecular weight distribution (Mw/Mn) in the above range is used, a resin composition capable of preparing a foam having excellent compression set properties and shaping properties is obtained. Such an ethylene/α-olefin copolymer (A) usually exhibits properties of an elastomer.

When a ratio ((MFR10)/(MFR2)) of a melt flow rate (MFR10) of the ethylene/α-olefin copolymer (A), as measured at 190° C. under a load of 10 kg in accordance with ASTM D 1238, to a melt flow rate (MFR2) thereof, as measured under a load of 2.16 kg satisfies the following formula:

(MFR10)/(MFR2)≥6.0, preferably

7≤(MFR10)/(MFR2)≤15, and a molecular weight distribution (Mw/Mn) and the above melt flow ratio satisfy the following formula:

Mw/Mn+5.0<(MFR10)/(MFR2), a resin composition capable of preparing a foam (non-crosslinked foam, crosslinked foam) which has a high expansion ratio, i.e., low specific gravity, has high elasticity and is excellent in compression set properties and shaping properties is obtained.

An intensity ratio (Tαβ/Tαα) of Tαβ to Tαα in a $^{13}$C-NMR spectrum of the ethylene/α-olefin copolymer (A) of the present invention is desired to be not more than 0.5, preferably not more than 0.4.

The Tαβ and the Tαα in the $^{13}$C-NMR spectrum are each a peak intensity of CH$_2$ in the constituent unit derived from the α-olefin of 3 or more carbon atoms, and they mean two kinds of CH$_2$ different in position to the tertiary carbon, as shown below.

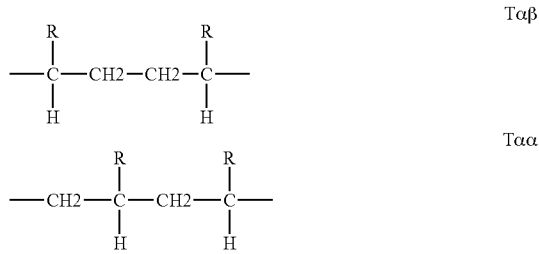

The Tαβ/Tαα intensity ratio can be determined in the following manner. That is to say, a $^{13}$C-NMR spectrum of the ethylene/α-olefin copolymer (A) is measured by the use of, for example, a JEOL-GX270 NMR measuring device manufactured by JEOL Ltd. The measurement is carried out using a mixed solution of hexachlorobutadiene/d$^6$-benzene (2/1 by volume) having been adjusted to a sample concentration of 5% by weight, at 67.8 MHz and 25° C. with d$^6$-benzene (128 ppm) as the standard. The $^{13}$C-NMR spectrum thus measured is analyzed in accordance with Lindemann-Adams' proposal (Analysis Chemistry 43, p. 1245 (1971)) and J. C. Randall (Review Macromolecular Chemistry Physics, C29, 201 (1989)) to determine the Tαβ/Tαα intensity ratio.

The ethylene/α-olefin copolymer (A) desirably has a B value, as determined by the $^{13}$C-NMR spectrum and the following formula (I), of 0.9 to 1.5, preferably 0.95 to 1.2.

$$B \text{ value} = [POE]/(2 \cdot [PE][Po]) \quad (1)$$

(In the above formula, [PE] is a molar fraction of constituent units derived from ethylene in the copolymer, [PO] is a molar fraction of constituent units derived from the α-olefin in the copolymer, and [POE] is a proportion of the number of ethylene/α-olefin chains to the number of all the dyad chains in the copolymer.) This B value is an index of a distribution of ethylene and the α-olefin of 3 to 20 carbon atoms in the ethylene/α-olefin copolymer (A), and can be determined based on the reports by J. C. Randall (Macromolecules, 15, 353 (1982)), J. Ray (Macromolecules, 10, 773 (1977)), or the like.

The B value of the ethylene/α-olefin copolymer (A) is usually determined by homogeneously dissolving about 200 mg of an ethylene/α-olefin copolymer in 1 ml of hexachlorobutadiene in a sample tube having a diameter of 10 mm to prepare a sample and measuring a $^{13}$C-NMR spectrum of the sample under the conditions of a measuring temperature of 120° C., a measuring frequency of 25.05 MHz, a spectral width of 1500 Hz, a pulse repetition time of 4.2 sec and a pulse width of 6 μsec.

As the B value is increased, blocklike chains of the ethylene or α-olefin copolymer become shorter, and this indicates that ethylene and the α-olefin are uniformly distributed and the composition distribution of the copolymer rubber is narrow. As the B value becomes smaller than 1.0, the composition distribution of the ethylene/α-olefin copolymer becomes broader, and a problem of deterioration of handling properties occurs.

Such an ethylene/α-olefin copolymer (A) can be prepared by a hitherto publicly known process using a vanadium catalyst, a titanium catalyst, a metallocene catalyst or the like. In particular, a solution polymerization process described in Japanese Patent Laid-Open Publication No. 121709/1987, etc. is preferable.

Hydrogenated Copolymer (B) Obtained by Hydrogenating Copolymer Comprising Conjugated Diene and Vinyl Aromatic Compound The hydrogenated copolymer (B) obtained by hydrogenating a copolymer comprising a conjugated diene and a vinyl aromatic compound, which is used in the present invention, is preferably a hydrogenated copolymer which is obtained by hydrogenating a copolymer comprising a conjugated diene and a vinyl aromatic compound and satisfies the following (a) to (d).

(a) The content of the vinyl aromatic compound in the hydrogenated copolymer is more than 50% by weight and not more than 90% by weight; (b) the content of vinyl aromatic compound polymer blocks in the hydrogenated copolymer is not more than 40% by weight; (c) the hydrogenated copolymer has a weight-average molecular weight of 50,000 to 1,000,000; and (d) the content of the hydrogenated copolymer wherein not less than 75% of double bonds based on the conjugated diene compound are hydrogenated is in the range of 5% by weight to 95% by weight.

The hydrogenated copolymer (B) obtained by hydrogenating a copolymer comprising a conjugated diene and a vinyl aromatic compound, which is used in the present invention, is characterized in that it does not have a glass transition point of not higher than −10° C. when measured at a frequency of 1 Hz in accordance with JIS-K7198. The expression "it does not have a glass transition point" means that it does not have a glass transition point of an intensity nearly equal (not less than 10% of an intensity in other temperature ranges) to that of a glass transition point present in other temperature ranges (e.g., between −9° C. and 150° C.). The hydrogenated copolymer (B) for use in the present invention has one or more glass transition points between −9° C. and 150° C. The glass transition point was measured by processing the hydrogenated copolymer into a sheet of 1 mm and using RAS-II manufactured by Rheometrics Inc. That is to say, the measurement was carried out using a probe having a diameter of 10 mm in a nitrogen atmosphere under the conditions of a preset strain of 0.5%, a heating rate of 2° C./min, a temperature range of −20° C. to 60° C. and a frequency of 1 Hz. A peak of the loss tangent tan δ at each temperature was regarded as a glass transition point of the hydrogenated copolymer. The measurement was carried out every degree centigrade.

In the hydrogenated copolymer (B) obtained by hydrogenating a copolymer comprising a conjugated diene and a vinyl aromatic compound, the content of the vinyl aromatic compound is more than 50% by weight and not more than 90% by weight, preferably more than 60% by weight and not more than 88% by weight, more preferably 62 to 86% by weight. In order to obtain a foam having excellent foaming properties and vibration-damping properties, it is necessary to use the hydrogenated copolymer (B) having a content of the vinyl aromatic compound in the range defined by the present invention. In the present invention, the content of the vinyl aromatic compound in the hydrogenated copolymer (B) may be grasped as a content of the vinyl aromatic compound in the copolymer before hydrogenation.

In the hydrogenated copolymer (B) for use in the present invention, the content of vinyl aromatic compound polymer blocks is not more than 40% by weight, preferably 3 to 40% by weight, more preferably 5 to 35% by weight. In the case where the foam of the present invention having more excellent flexibility is intended, it is recommended that the content of the vinyl aromatic compound polymer blocks is less than 10% by weight, preferably less than 8% by weight, more preferably less than 5% by weight. In the case where the foam of the present invention having excellent blocking resistance is intended, it is recommended that the content of the vinyl aromatic compound polymer blocks in the hydrogenated copolymer (B) is in the range of 10 to 40% by weight, preferably 13 to 37% by weight, more preferably 15 to 35% by weight. A content of the vinyl aromatic compound polymer blocks exceeding 40% by weight is undesirable because foaming properties are deteriorated.

Measurement of the content of the vinyl aromatic compound polymer blocks is carried out in the following method. For example, the copolymer before hydrogenation is subjected to an oxidative destruction by tertiary butyl hydroperoxide using osmium tetraoxide as a catalyst (method of I. M. KOLTHOFF, et al., described in J. Polym. Sci. 1, 429 (1946)) to obtain the weight of the vinyl aromatic hydrocarbon polymer block component (except the vinyl aromatic hydrocarbon polymer component having a mean polymerization degree of about 30 or less). Using the resulting weight, the content of the vinyl aromatic compound polymer blocks can be determined by the following formula.

Content (wt %) of vinyl aromatic compound polymer blocks=(weight of vinyl aromatic hydrocarbon polymer blocks in copolymer before hydrogenation/weight of copolymer before hydrogenation)×100

In the present invention, it is recommended that the block ratio of the vinyl aromatic compound in the hydrogenated copolymer (B) is less than 50% by weight, preferably not more than 20% by weight, more preferably not more than 18% by weight. The block ratio used herein means a proportion of the amount of the vinyl aromatic compound polymer blocks to the whole amount of the vinyl aromatic compound in the copolymer.

The weight-average molecular weight of the hydrogenated copolymer (B) for use in the present invention is in the range of 50,000 to 1,000,000, preferably 100,000 to 800,000, more preferably 130,000 to 500,000. In the case where a hydrogenated copolymer (B) having a vinyl aromatic compound polymer block content of 10 to 40% by weight is used, it is recommended that the weight-average molecular weight is more than 100,000 and less than 500,000, preferably 130,000 to 400,000, more preferably 150,000 to 300,000. If the weight-average molecular weight is less than 50,000, foaming properties are deteriorated. If the weight-average molecular weight exceeds 1,000,000, molding processability is deteriorated. In the present invention, it is recommended from the viewpoint of molding processability that the molecular weight distribution of the hydrogenated copolymer (B) is in the range of preferably 1.5 to 5.0, more preferably 1.6 to 4.5, still more preferably 1.8 to 4.

The hydrogenated copolymer (B) for use in the present invention is a hydrogenation product of a copolymer comprising a conjugated diene and a vinyl aromatic compound, and, not less than 75%, preferably not less than 85%, more preferably not less than 90%, particularly preferably not less than 92%, of double bonds derived from the conjugated diene compound in the copolymer have been hydrogenated. If the degree of hydrogenation is less than 75%, weathering resistance and heat stability are deteriorated.

In the present invention, there is no specific limitation on the structure of the hydrogenated copolymer (B), and a hydrogenated copolymer of any structure is employable. However, a hydrogenation product of a copolymer having at least one structure selected from structures of the following formulas a to e is particularly recommended. The hydrogenated copolymer (B) for use in the present invention may be an arbitrary mixture of hydrogenation products of copolymers having structures represented by the following formulas, or the hydrogenated copolymer may be mixed with a vinyl aromatic compound polymer.

a: S
b: S—H
c: S—H—S
d: (S—H)$_m$—X
e: (S—H)$_n$—X—(H)$_p$ (In the above formulas, S is a conjugated diene/vinyl aromatic compound random copolymer block, H is a vinyl aromatic compound polymer block, m is an integer of 2 or greater, n and p are each an integer of 1 or greater, and X is a coupling agent residue.)

In the above formulas, the vinyl aromatic hydrocarbons in the random copolymer block S may be uniformly distributed or may be distributed in a tapered form. In the copolymer block S, plural portions wherein the vinyl aromatic hydrocarbons are uniformly distributed and/or plural portions wherein they are distributed in a tapered form may coexist. m is an integer of 2 or greater, preferably 2 to 10, and n and p are each an integer of 1 or greater, preferably 1 to 10.

In the present invention, it is recommended that a difference between the maximum value of the quantity of vinyl bonds in the copolymer chains before hydrogenation and the minimum value thereof is less than 10%, preferably not more than 8%, more preferably not more than 6%. The vinyl bonds in the copolymer chains may be uniformly distributed or may be distributed in a tapered form. The difference between the maximum value of the quantity of the vinyl bonds and the minimum value thereof is that between the maximum value of the vinyl quantity determined by the polymerization conditions, i.e., the type and the quantity of a vinyl quantity-controlling agent and the polymerization temperature and the minimum value thereof. The difference between the maximum value of the quantity of the vinyl bonds in the copolymer chains and the minimum value thereof can be controlled by, for example, the polymerization temperature in the polymerization of the conjugated diene or in the copolymerization of the conjugated diene and the vinyl aromatic compound.

In the case where the type and the quantity of a vinyl quantity-controlling agent such as a tertiary amine compound or an ether compound are fixed, the quantity of vinyl bonds introduced into the polymer chains in the polymerization is determined by the polymerization temperature. Therefore, a polymer produced at a constant temperature becomes a polymer wherein the vinyl bonds are uniformly distributed. In contrast therewith, a polymer produced while raising the temperature becomes a polymer having a difference in the vinyl bond quantity, such as a polymer having a large vinyl bond quantity in the initial stage (polymerization at low temperatures) and having a small vinyl bond quantity in the latter stage (polymerization at high temperatures). By hydrogenating a copolymer having such a structure, a hydrogenated copolymer of a specific structure is obtained.

In the present invention, the content of the vinyl aromatic compound can be found by the use of an ultraviolet spectrophotometer. The quantity of the vinyl aromatic compound polymer blocks can be found by the aforesaid KOLTHOFF's method. The content of the vinyl bonds based on the conjugated diene in the copolymer before hydrogenation can be found by the use of a nuclear magnetic resonance device (NMR). The degree of hydrogenation of the hydrogenated copolymer can be found by the use of a nuclear magnetic resonance device (NMR). In the present invention, the molecular weight of the hydrogenated copolymer is a weight-average molecular weight that is determined by measuring a molecular weight at a peak of a chromatogram by gel permeation chromatography (GPC) and using a calibration curve determined by the measurement of commercially available standard polystyrene (made by the use of a peak molecular weight of standard polystyrene). The molecular weight distribution of the hydrogenated copolymer (B) can be determined by the measurement utilizing GPC, similarly to the above.

In the present invention, the conjugated diene is a diolefin having a pair of conjugated double bonds, and examples thereof include 1,3-butadiene, 2-methyl-1,3-butadiene (isoprene), 2,3-dimethyl-1,3-butadiene, 1,3-pentadiene, 2-methyl-1,3-pentadiene and 1,3-hexadiene. Generally used are 1,3-butadiene and isoprene. These dienes may be used singly or in combination of two or more kinds. Examples of the vinyl aromatic compounds include styrene, α-methylstyrene, p-methylstyrene, divinylbenzene, 1,1-diphenylethylene, N,N-dimethyl-p-aminoethylstyrene and N,N-diethyl-p-aminoethylstyrene. These compounds may be used singly or in combination of two or more kinds.

In the present invention, the micro structure (ratio between cis, trans and vinyl) of the conjugated diene portion in the copolymer before hydrogenation can be arbitrarily changed by the use of the later-described polar compound or the like and is not specifically restricted. It is generally recommended that when 1,3-butadiene is used as the conjugated diene, the quantity of 1,2-vinyl bonds is in the range of 5 to 80%, preferably 10 to 60%, and when isoprene or a mixture of 1,3-butadiene and isoprene is used as the conjugated diene, the total quantity of 1,2-vinyl bonds and 3,4-vinyl bonds is in the range of usually 3 to 75%, preferably 5 to 60% is recommended. In the present invention, the total quantity of the 1,2-vinyl bonds and the 3,4-vinyl bonds (quantity of the 1,2-vinyl bonds in the case where 1,3-butadiene is used as the conjugated diene) is referred to as "vinyl bond" hereinafter.

In the present invention, the copolymer before hydrogenation is obtained by, for example, anion living polymerization using an initiator, such as an organic alkali metal compound, in a hydrocarbon solvent. Examples of the hydrocarbon solvents include aliphatic hydrocarbons, such as n-butane, isobutene, n-pentane, n-hexane, n-heptane and n-octane; alicyclic hydrocarbons, such as cyclohexane, cycloheptane and methylcycloheptane; and aromatic hydrocarbons, such as benzene, toluene, xylene and ethylbenzene.

Examples of the initiators include aliphatic hydrocarbon alkali metal compounds, aromatic hydrocarbon alkali metal compounds and organic amino alkali metal compounds, which are generally known to have anionic polymerization activity to conjugated diene compounds and vinyl aromatic compounds. Examples of the alkali metals include lithium, sodium and potassium. Preferred organic alkali metal compounds are aliphatic and aromatic hydrocarbon lithium compounds of 1 to 20 carbon atoms. Examples of such lithium compounds include compounds containing one lithium in one molecule, and dilithium compounds, trilithium compounds and tetralithium compounds containing plural lithiums in one molecule.

Specifically, there can be mentioned n-propyllithium, n-butyllithium, sec-butyllithium, tert-butyllithium, n-pentyllithium, n-hexyllithium, benzyllithium, phenyllithium, tolyllithium, a reaction product of diisopropenylbenzene and sec-butyllithium, and further a reaction product of divinylbenzene, sec-butyllithium and a small amount of 1,3-butadiene, etc.

Further, also employable are 1-(t-butoxy)propyllithium and a lithium compound obtained by inserting one to several molecules of an isoprene monomer into the 1-(t-butoxy)propyllithium in order to improve its solubility, which are disclosed in U.S. Pat. No. 5,708,092, siloxy group-containing alkyllithium such as 1-(t-butyldimethylsiloxy)hexyllithium disclosed in U.K. Patent No. 2,241,239, and aminolithiums, such as amino group-containing alkyllithium, diisopropylamidolithium and hexamethyldisilazidolithium, which are disclosed in U.S. Pat. No. 5,527,753.

In the copolymerization of the conjugated diene compound and the vinyl aromatic compound using the organic alkali metal compound as a polymerization initiator in the present invention, a tertiary amine compound or an ether compound can be added as a controlling agent in order to control the content of the vinyl bonds (1,2- or 3,4-bonds) that are attributable to the conjugated diene compound and incorporated into the polymer and in order to control random copolymerizability of the conjugated diene compound and the vinyl aromatic compound. The tertiary amine compound is a compound represented by the general formula $R_1R_2R_3N$ (wherein $R_1$, $R_2$ and $R_3$ are each a hydrocarbon group of 1 to 20 carbon atoms or a hydrocarbon group having a tertiary amino group).

The ether compound is selected from linear ether compounds and cyclic ether compounds. Examples of the linear ether compounds include dimethyl ether, diethyl ether, diphenyl ether, and dialkyl ether compounds of ethylene glycol, such as ethylene glycol dimethyl ether, ethylene glycol diethyl ether and ethylene glycol dibutyl ether. Also employable are dialkyl ether compounds of diethylene glycol, such as diethylene glycol dimethyl ether, diethylene glycol diethyl ether and diethylene glycol dibutyl ether.

Examples of the cyclic ether compounds include tetrahydrofuran, dioxane, 2,5-dimethyloxolane, 2,2,5,5-tetramethyloxolane, 2,2-bis(2-oxysolanyl)propane, and alkyl ether of furfuryl alcohol.

In the present invention, the process for copolymerizing the conjugated diene compound and the vinyl aromatic compound using the organic alkali metal compound as a polymerization initiator may be a batchwise polymerization process, a continuous polymerization process or a combination thereof. In particular, the continuous polymerization process is recommended in order that the molecular weight distribution may be regulated in a preferred range. The polymerization temperature is in the range of generally 0° C. to 180° C., preferably 30° C. to 150° C. The time required for the polymerization varies depending upon the conditions, but it is usually not more than 48 hours, particularly preferably 0.1 to 10 hours.

The atmosphere of the polymerization system is preferably an atmosphere of an inert gas such as a nitrogen gas. The polymerization pressure is not specifically restricted, and the polymerization has only to be carried out at a pressure adequate to maintain the monomer and the solvent in liquid phases in the above-mentioned polymerization temperature range. It is necessary to pay attention so that impurities which deactivate the catalyst and the living polymer, such as water, oxygen and carbon dioxide gas, should not be included into the polymerization system. In the present invention, coupling reaction can be carried out after completion of the polymerization by adding a necessary amount of a bifunctional or higher functional coupling agent. The bifunctional coupling agent may be any of publicly known ones and is not specifically restricted. For example, there can be mentioned dihalogen compounds, such as dimethyldichlorosilane and dimethyldibromosilane, and acid esters, such as methyl benzoate, ethyl benzoate, phenyl benzoate and phthalic acid esters.

The trifunctional or higher polyfunctional coupling agent may be any of publicly known ones and is not specifically restricted. For example, there can be mentioned trihydric or higher polyalcohols, polyvalent epoxy compounds, such as epoxidized soybean oil and diglycidyl bisphenol A, and polyvalent halogen compounds, e.g., silicon halide compounds represented by the general formula $R_{4-n}SiX_n$ (wherein R is a hydrocarbon group of 1 to 20 carbon atoms, X is halogen, and n is an integer of 3 to 4), such as methylsilyl trichloride, t-butylsilyl trichloride, silicon tetrachloride and bromides thereof, and tin halide compounds represented by the general formula $R_{4-n}SnX_n$ (wherein R is a hydrocarbon group of 1 to 20 carbon atoms, X is halogen, and n is an integer of 3 to 4), such as methyltin trichloride, t-butyltin trichloride and tin tetrachloride. Dimethyl carbonate and diethyl carbonate etc. are also employable.

In the present invention, an end-modified copolymer wherein a polar group-containing atomic group is bonded to at least one polymer chain end of a polymer can be used as the copolymer. Examples of the polar group-containing atomic groups include atomic groups containing at least one polar group selected from hydroxyl group, carboxyl group, carbonyl group, thiocarbonyl group, acid halide group, acid anhydride group, carboxylic acid group, thiocarboxylic acid group, aldehyde group, thioaldehyde group, carboxylic acid ester group, amide group, sulfonic acid group, sulfonic acid ester group, phosphoric acid group, phosphoric acid ester group, amino group, imino group, nitrile group, pyridyl group, quinoline group, epoxy group, thioepoxy group, sulfide group, isocyanate group, isothiocyanate group, silicon halide group, silanol group, alkoxysilicon group, tin halide group, alkoxytin group and phenyltin group.

The end-modified copolymer is obtained by allowing the copolymer to react with a compound having the above polar group-containing atomic group when the polymerization is completed. Specifically, as the compound having a polar group-containing atomic group, an end modifier described in Japanese Patent Publication No. 39495/1992 is employable. By hydrogenating the copolymer obtained above, the hydrogenated copolymer (B) for use in the present invention is obtained. The hydrogenation catalyst is not specifically restricted, and (1) a supported type heterogeneous hydrogenation catalyst wherein a metal such as Ni, Pt, Pd or Ru is supported on carbon, silica, alumina, diatomaceous earth or the like, (2) a so-called Ziegler type hydrogenation catalyst using an organic acid salt of Ni, Co, Fe, Cr or the like or a transition metal salt such as acetylacetone salt and a reducing gent such as organoaluminum, and (3) a homogeneous hydrogenation catalyst, e.g., a so-called organometallic complex such as an organometallic compound of Ti, Ru, Rh, Zr or the like, which are hitherto publicly known, are employed.

Specifically, hydrogenation catalysts described in Japanese Patent Publication No. 8704/1967, Japanese Patent Publication No. 6636/1968, Japanese Patent Publication No. 4841/1988, Japanese Patent Publication No. 37970/1989, Japanese Patent Publication No. 53851/1989 and Japanese Patent Publication No. 9041/1990 are employable. As preferred hydrogenation catalysts, there can be mentioned titanocene compounds and/or mixtures of the titanocene compounds and reducing organometallic compounds. As the titanocene compounds, compounds described in Japanese Patent Laid-Open Publication No. 109219/1996 are employable. Examples of such compounds include compounds having at least one ligand having a (substituted) cyclopentadienyl skeleton, an indenyl skeleton or a fluorenyl skeleton, such as biscyclopentadienyltitanium dichloride and monopentamethylcyclopentadienyltitanium trichloride. Examples of the reducing organometallic compounds include organic alkali metal compounds such as organolithium, organomagnesium compounds, organoaluminum compounds, organoboron compounds and organozinc compounds.

In the present invention, the hydrogenation reaction is carried out in the temperature range of generally 0 to 200° C., preferably 30 to 150° C. As the hydrogen pressure used in the hydrogenation reaction, a pressure of 0.1 to 15 MPa, preferably 0.2 to 10 MPa, more preferably 0.3 to 5 MPa, is recommended. The hydrogenation reaction time is in the range of usually 3 minutes to 10 hours, preferably 10 minutes to 5 hours. The hydrogenation reaction can be carried out by any of a batch process, a continuous process and a combination thereof.

From the solution of the hydrogenated copolymer obtained as above, a catalyst residue can be removed when needed, and the hydrogenated copolymer can be separated from the solution. Examples of methods to separate the solvent include a method wherein to the reaction solution after hydrogenation is added a polar solvent that is a poor solvent for the hydrogenated copolymer, such as acetone or alcohol, to precipitate the polymer, followed by recovering the polymer, a method wherein the reaction solution is introduced into hot water with stirring, and the solvent is removed by steam stripping to recover the polymer, and a method wherein the polymer solution is directly heated to distill off the solvent. To the hydrogenated copolymer (B) for use in the present invention, stabilizers, such as various phenol-based stabilizers, phosphorus-based stabilizers, sulfur-based stabilizers and amine-based stabilizers, can be added.

The unmodified hydrogenated copolymer for use in the present invention may be modified with α,β-unsaturated carboxylic acids or derivatives thereof, such as anhydrides thereof, esterification products thereof, amidation products thereof and imidation products thereof. Examples of the α,β-unsaturated carboxylic acids and derivatives thereof include maleic anhydride, maleic anhydride imide, acrylic acid and its esters, methacrylic acid and its esters, and endo-cis-bicyclo[2,2,1]-5-heptene-2,3-dicarboxylic acid and its anhydrides. The amount of the α,β-unsaturated carboxylic acid or its derivative added is in the range of generally 0.01 to 20 parts by weight, preferably 0.1 to 10 parts by weight, based on 100 parts by weight of the hydrogenated polymer.

As the hydrogenated copolymer (B) obtained by hydrogenating a copolymer comprising a conjugated diene and a vinyl aromatic compound, which is employable in the present invention, a commercially available one is also employable, and for example, "S.O.ER-SS" (trade name, available from Asahi Kasei Corporation) is employable.

At Least One Resin (C) Selected from the Group Consisting of Rosin-Based Resin, Terpene-Based Resin and Petroleum Resin At least one resin (C) selected from the group consisting of rosin-based resins, terpene-based resins and petroleum resins, which is used in the present invention, has a softening point, as measured by a ring and ball method, of preferably 40 to 180° C., more preferably 70 to 170° C., still more preferably 110 to 160° C.

As the resin (C) selected from the above group, two or more resins may be used, and for example, two rosin-based resins may be selected or one rosin-based resin and one resin other than the rosin-based resins may be selected. In this case, the thus selected two or more resins are referred to as the component (C). In the case where two or more resins are used as the component (C), these two or more resins are blended in the quantity ratio that is adopted in the use of two or more resins, and if the property values of the resulting blend are in the preferred ranges of the component (C), the component (C) consisting of the two or more resins is considered to satisfy the preferred ranges of the component (C).

Examples of the rosin-based resins include natural rosin, polymerized rosin and modified rosin having been modified with maleic acid, fumaric acid, (meth)acrylic acid or the like. Examples of rosin derivatives include esterification products of the above rosins, phenol modified products thereof and esterification products thereof. Further, hydrogenation products of these resins are also employable.

Examples of the terpene-based resins include resins comprising α-pinene, β-pinene, limonene, dipentene, terpene phenol, terpene alcohol and terpene aldehyde. Further, aromatic modified terpene-based resins obtained by polymerizing α-pinene, β-pinene, limonene, dipentene or the like and aromatic monomers such as styrene are also employable. Furthermore, hydrogenation products of these resins are also employable.

Examples of the petroleum resins include aliphatic petroleum resins using a C5 fraction of tar naphtha as a main raw material, aromatic petroleum resins using a C9 fraction as a main raw material, and copolymerized petroleum resins thereof. That is to say, there can be mentioned a C5-based petroleum resin (resin obtained by polymerizing C5 fraction of naphtha cracked oil), a C9-based petroleum resin (resin obtained by polymerizing C9 fraction of naphtha cracked oil), and a C5C9 copolymerized petroleum resin (resin obtained by copolymerizing C5 fraction and C9 fraction of naphtha cracked oil), and there can be also mentioned coumarone-indene resins containing styrenes, indenes, coumarone, dicyclopentadiene or the like of tar naphtha fractions, alkylphenol resins, such as a condensate of p-tertiary butylphenol and acetylene as a typical one, and xylene-based resins obtained by the reaction of o-xylene, p-xylene, m-xylene or the like with formalin.

The at least one resin (C) selected from the group consisting of rosin-based resins, terpene-based resins and petroleum resins, which is used in the present invention, is preferably a hydrogenated derivative because it is excellent in weathering resistance and discoloration resistance.

As the at least one resin (C) selected from the group consisting of rosin-based resins, terpene-based resins and petroleum resins, which is used in the present invention, a commercially available one is employable, and examples of the rosin-based natural resins include "Ester Gum", "Pencell" and "Super Ester" (trade names, available from Arakawa Chemical Industries, Ltd.). Examples of the terpene-based natural resins include "YS Resin", "YS Polystar" and "Clearon" (trade names, available from Yasuhara Chemical Co., Ltd.). Examples of the petroleum resins include "Alkon" (trade name, available from Arakawa Chemical Industries, Ltd.). When the at least one resin (C) selected from the group consisting of rosin-based resins, terpene-based resins and petroleum resins is used in the present invention, it is used in an amount of 1 to 1900 parts by weight, preferably 5 to 1900 parts by weight, more preferably 5 to 100 parts by weight, based on 100 parts by weight of the total of the ethylene/α-olefin copolymer (A) and the hydrogenated copolymer (B) obtained by hydrogenating a copolymer comprising a conjugated diene and a vinyl aromatic compound.

Ethylene/Polar Monomer Copolymer (D)

Examples of polar monomers of the ethylene/polar monomer copolymers (D) for use in the present invention include unsaturated carboxylic acids, salts thereof, esters thereof, amides thereof, vinyl esters and carbon monoxide. More specifically, there can be mentioned unsaturated carboxylic acids, such as acrylic acid, methacrylic acid, fumaric acid, itaconic acid, monomethyl maleate, monoethyl maleate, maleic anhydride and itaconic anhydride; monovalent metal (e.g., lithium, sodium, potassium) salts of these unsaturated carboxylic acids; polyvalent metal (e.g., magnesium, calcium, zinc) salts of these unsaturated carboxylic acids; unsaturated carboxylic acid esters, such as methyl acrylate, ethyl acrylate, isopropyl acrylate, isobutyl acrylate, n-butyl acrylate, isooctyl acrylate, methyl methacrylate, ethyl methacrylate, isobutyl methacrylate and dimethyl maleate; vinyl esters, such as vinyl acetate and vinyl propionate; carbon monoxide; and sulfur dioxide. These monomers can be used singly or in combination of two or more kinds.

Typical examples of the ethylene/polar monomer copolymers (D) include ethylene/unsaturated carboxylic acid copolymers, such as an ethylene/acrylic acid copolymer and an ethylene/methacrylic acid copolymer; ionomers wherein a part or all of carboxyl groups of these ethylene/unsaturated carboxylic acid copolymers are neutralized by the above metals; ethylene/unsaturated carboxylic acid ester copolymers, such as an ethylene/methyl acrylate copolymer, an ethylene/ethyl acrylate copolymer, an ethylene/methyl methacrylate copolymer, an ethylene/isobutyl acrylate copolymer and an ethylene/n-butyl acrylate copolymer; ethylene/unsaturated carboxylic acid ester/unsaturated carboxylic acid copolymers, such as an ethylene/isobutyl acrylate/methacylic acid copolymer and an ethylene/n-butyl acrylate/methacylic acid copolymer; ionomers wherein a part or all of carboxyl groups of these ethylene/unsaturated carboxylic acid ester/unsaturated carboxylic acid copolymers are neutralized by the above metals; and ethylene/vinyl ester copolymers, such as an ethylene/vinyl acetate copolymer.

Of these, preferable is a copolymer of ethylene and a polar monomer selected from unsaturated carboxylic acids, salts thereof, esters thereof and vinyl acetate; particularly preferable is an ionomer of an ethylene/(meth)acrylic acid copolymer, an ionomer of an ethylene/(meth)acrylic acid/(meth)acrylic acid ester copolymer or an ethylene/vinyl acetate copolymer; and most preferable is an ethylene/vinyl acetate copolymer.

As the ethylene/polar monomer copolymer (D), an ethylene/polar monomer copolymer having a polar monomer content of 1 to 50% by weight, particularly 5 to 45% by weight, is preferable though the polar monomer content varies depending upon the type of the polar monomer. Taking into account molding processability, mechanical strength, etc., it is preferable to use, as such an ethylene/polar monomer copolymer, an ethylene/polar monomer copolymer having a melt flow rate, as measured at 190° C. under a load of 2160 g, of 0.05 to 500 g/10 min, particularly 0.5 to 20 g/10 min. The copolymer of ethylene and an unsaturated carboxylic acid, an unsaturated carboxylic acid ester, a vinyl ester or the like can be obtained by radical copolymerization at a high temperature under high pressure. The copolymer (ionomer) of ethylene and a metal salt of an unsaturated carboxylic acid can be obtained by the reaction of an ethylene/unsaturated carboxylic acid copolymer with the corresponding metallic compound.

When the ethylene/polar monomer copolymer (D) for use in the present invention is an ethylene/vinyl acetate copolymer, the content of the vinyl acetate in the ethylene/vinyl acetate copolymer is in the range of 10 to 30% by weight, preferably 15 to 30% by weight, more preferably 15 to 25% by weight.

The ethylene/vinyl acetate copolymer has a melt flow rate (MFR, ASTM D1238, 190° C., load of 2.16 kg) of 0.1 to 50 g/10 min, preferably 0.5 to 20 g/10 min, more preferably 0.5 to 5 g/10 min.

In the case where the ethylene/polar monomer copolymer (D) is used, it is used in an amount of 1 to 1900 parts by weight, preferably 5 to 1900 parts by weight, more preferably 5 to 100 parts by weight, based on 100 parts by weight of the total of the ethylene/α-olefin copolymer (A) and the hydrogenated copolymer (B) obtained by hydrogenating a copolymer comprising a conjugated diene and a vinyl aromatic compound. When the ethylene/polar monomer copolymer (D) is a copolymer of ethylene and an unsaturated carboxylic acid and is used in the above amount, an elastomer composition capable of providing a crosslinked foam having excellent adhesion to other layers composed of polyurethane, rubber, leather, etc. can be obtained. When the ethylene/polar monomer copolymer (D) is used in the above amount, the resulting foam layer exhibits excellent adhesion to other layers composed of polyurethane, rubber, leather, etc. and is preferable for forming a laminate.

Blowing Agent (E)

Examples of chemical blowing agents as the blowing agents (E) which are used in the present invention when needed include azo compounds, such as azodicarbonamide (ADCA), 1,1'-azobis(1-acetoxy-1-phenylethane), dimethyl-2,2'-azobisbutyrate, dimethyl-2,2'-azobisisobutyrate, 2,2'-azobis(2,4,4-trimethylpentane), 1,1'-azobis(cyclohexane-1-carbonitrile) and 2,2'-azobis[N-(2-carboxyethyl)-2-methylpropionamidine; nitroso compounds, such as N,N'-dinitrosopentamethylenetetramine (DPT); hydrazine derivatives, such as 4,4'-oxybis(benzenesulfonylhydrazide) and diphenylsulfone-3,3'-disulfonylhydrazide; semicarbazide compounds, such as p-toluenesulfonyl semicarbazide; organic thermal decomposition type blowing agents, such as trihydrazinotriazine; further bicarbonates, such as sodium hydrogen carbonate and ammonium hydrogen carbonate; carbonates, such as sodium carbonate and ammonium carbonate; nitrites, such as ammonium nitrite; and inorganic thermal decomposition type blowing agents, such as hydrogen compounds. Of these, azodicarbonamide (ADCA) and sodium hydrogen carbonate are particularly preferable.

In the present invention, a physical blowing agent (blowing agent which is not necessarily attended with chemical reaction in the foaming stage) is also employable as the blowing agent (E). Examples of the physical blowing agents include methanol, ethanol, various aliphatic hydrocarbons, such as propane, butane, pentane and hexane; various chlorinated hydrocarbons, such as dichloroethane, dichloromethane and carbon tetrachloride; organic physical blowing agents, e.g., various chlorinated fluorohydrocarbons, such as flon; and inorganic physical blowing agents, such as air, carbon dioxide, nitrogen, argon and water. Of these, most preferable are carbon dioxide, nitrogen and argon, which do not need to be vaporized, are inexpensive and have very little possibility of environmental pollution or firing.

The physical blowing agent used as the blowing agent (E) in the present invention is free from decomposition residue of the blowing agent, and therefore, it can prevent mold stain in the crosslinking-foaming process of the composition. Further, the physical blowing agent is not powdery and therefore exhibits excellent kneading properties. By the use of the physical blowing agent, foreign odor of the resulting crosslinked foam (odor of ammonia produced in the decomposition of ADCA) can be prevented.

In the present invention, the aforesaid chemical blowing agent can be used in combination with the physical blowing agent within limits not exerting bad influences such as odor and mold stain.

Methods for storing the physical blowing agent are as follows. In the case of small scale production, carbon dioxide, nitrogen or the like contained in a bomb is used, and it can be fed to an injection molding machine, an extrusion molding machine or the like through a pressure reducing valve, or in some cases, the pressure of the blowing agent is increased by a pump or the like, and the blowing agent is fed to an injection molding machine, an extrusion molding machine or the like.

In the case where a facility to produce foamed articles on a large scale is used, a storage tank for liquid carbon dioxide, liquid nitrogen or the like is installed, and the liquid is passed through a heat exchanger to vaporize the liquid and fed to an injection molding machine, an extrusion molding machine or the like through a piping and a pressure reducing valve.

In the case of a liquid physical blowing agent, the storage pressure is preferably in the range of 0.13 to 100 MPa. If the pressure is too low, it becomes impossible to reduce the pressure and to feed the physical blowing agent to an injection molding machine, an extrusion molding machine or the like. If the pressure is too high, storage facility is undesirably made large-sized and complicated because there is a need to enhance pressure resistance of the storage facility. The term "storage pressure" defined herein is a pressure supplied to the pressure reducing valve after vaporization.

In the case where the chemical blowing agent is used as the blowing agent (E), the chemical blowing agent is used in an amount of usually 2 to 20 phr (weight percentage, that is, it means 2 to 20 parts by weight based on 100 parts by weight of the total of the component (A), the component (B), the component (C) and the component (D)), preferably 5 to 15 phr (weight percentage), based on 100 parts by weight of the total of the component (A), the component (B), the component (C) and the component (D). However, the amount of the chemical blowing agent used is properly controlled according to the desired expansion ratio because the amount of a gas generated varies depending upon the type and the grade of the blowing agent used.

In the case where the physical blowing agent is used as the blowing agent (E), the amount of the physical blowing agent added is properly determined according to the desired expansion ratio.

In the present invention, a blowing assistant may be used, if necessary, together with the blowing agent (E). The blowing assistant has functions of lowering the decomposition temperature of the blowing agent (E), accelerating decomposition, making bubbles uniform, etc. Examples of such blowing assistants include zinc oxide (ZnO), zinc stearate, organic acids, such as salicylic acid, phthalic acid, stearic acid and oxalic acid, urea and derivatives thereof.

Organic Peroxide (F)

Examples of the organic peroxides (F) which are used in the present invention as crosslinking agents when needed include dicumyl peroxide, di-t-butyl peroxide, 2,5-dimethyl-2,5-di(t-butylperoxy)hexane, 2,5-diemthyl-2,5-di(t-butylperoxy)hexyne-3,1,3-bis(t-butylperoxyisopropyl)benzene, 1,1-bis(t-butylperoxy)-3,3,5-trimethylcyclohexane, n-butyl-4,4-bis(t-butylperoxy)valeate, benzoyl peroxide, p-chlorobenzoyl peroxide, 2,4-dichlorobenzoyl peroxide, t-butyl peroxybenzoate, t-butyl perbenzoate, t-butylperoxyisopropyl carbonate, diacetyl peroxide, lauroyl peroxide and t-butyl-cumyl peroxide.

In the present invention, the organic peroxide (F) is used in an amount of usually 0.1 to 1.5 phr (weight percentage, that is, it means 0.1 to 1.5 parts by weight based on 100 parts by weight of the total of the component (A), the component (B), the component (C) and the component (D)), preferably 0.2 to 1.0 phr (weight percentage), based on 100 parts by weight of the total of the component (A), the component (B), the component (C) and the component (D). When the organic peroxide (F) is used in the above amount, a crosslinked foam having a proper crosslinked structure can be obtained. Further, when the organic peroxide (F) is used in the above amount together with the crosslinking assistant (G), a crosslinked foam having a more proper crosslinked structure can be obtained.

Crosslinking Assistant (G)

Preferred examples of the crosslinking assistants (G) which are used in the present invention when needed specifically include peroxy crosslinking assistants, such as sulfur, p-quinonedioxime p,p'-dibenzoyl quinonedioxime, N-methyl-N-4-dinitrosoaniline, nitrosobenzene, diphenylguanidine and trimethylolpropane-N,N'-m-phenylene dimaleimide, divinylbenzene, triallyl cyanurate (TAC), and triallyl isocyanurate (TAIC). Further, polyfunctional methacrylate monomers, such as ethylene glycol dimethacrylate, diethylene glycol dimethacrylate, polyethylene glycol dimethacrylate, trimethylolpropane trimethacrylate and allyl methacrylate, and polyfunctional vinyl monomers, such as vinyl butyrate and vinyl stearate, are also employable. Of these, triallyl cyanurate (TAC) and triallyl isocyanurate (TAIC) are preferable.

In the present invention, the crosslinking assistant (G) is desirably used in such an amount that the weight ratio ((F)/(G)) of the organic peroxide (F) to the crosslinking assistant (G) becomes 1/30 to 5/1, preferably 1/20 to 3/1, more preferably 1/15 to 2/1.

Resin Composition

The resin composition of the present invention comprises the ethylene/α-olefin copolymer (A) in an amount of 5 to 95 parts by weight, the hydrogenated copolymer (B) obtained by hydrogenating a copolymer comprising a conjugated diene and a vinyl aromatic compound, in an amount of 5 to 95 parts by weight, at least one resin (C) selected from the group consisting of rosin-based resins, terpene-based resins and petroleum resins, which is added if necessary, in an amount of 1 to 1900 parts by weight based on 100 parts by weight of the total of the ethylene/α-olefin copolymer (A) and the hydrogenated copolymer (B), and the ethylene/polar monomer copolymer (D), which is added if necessary, in an amount of 1 to 1900 parts by weight based on 100 parts by weight of the total of the ethylene/α-olefin copolymer (A) and the hydrogenated copolymer (B). The resin composition preferably comprises the ethylene/α-olefin copolymer (A) in an amount of 40 to 95 parts by weight, the hydrogenated copolymer (B) obtained by hydrogenating a copolymer comprising a conjugated diene and a vinyl aromatic compound, in an amount of 5 to 60 parts by weight, at least one resin (C) selected from the group consisting of rosin-based resins, terpene-based resins and petroleum resins, in an amount of 5 to 50 parts by weight based on 100 parts by weight of the total of the ethylene/α-olefin copolymer (A) and the hydrogenated copolymer (B), and the ethylene/polar monomer copolymer (D), which is added if necessary, in an amount of 1 to 1900 parts by weight based on 100 parts by weight of the total of the ethylene/α-olefin copolymer (A) and the hydrogenated copolymer (B). The resin composition more preferably comprises the ethylene/α-olefin copolymer (A) in an amount of 40 to 95 parts by weight, the hydrogenated copolymer (B) obtained by hydrogenating a copolymer comprising a conjugated diene and a vinyl aromatic compound, in an amount of 5 to 60 parts by weight, at least one resin (C) selected from the group consisting of rosin-based resins, terpene-based resins and petroleum resins, in an amount of 5 to 50 parts by weight based on 100 parts by weight of the total of the ethylene/α-olefin copolymer (A) and the hydrogenated copolymer (B), and the ethylene/polar monomer copolymer (D) in an amount of 5 to 100 parts by weight based on 100 parts by weight of the total of the ethylene/α-olefin copolymer (A) and the hydrogenated copolymer (B). The resin composition still more preferably comprises the ethylene/α-olefin copolymer (A) in an amount of 60 to 95 parts by weight, the hydrogenated copolymer (B) obtained by hydrogenating a copolymer comprising a conjugated diene and a vinyl aromatic compound, in an amount of 5 to 40 parts by weight, at least one resin (C) selected from the group consisting of rosin-based resins, terpene-based resins and petroleum resins, in an amount of 5 to 50 parts by weight based on 100 parts by weight of the total of the ethylene/α-olefin copolymer (A) and the hydrogenated copolymer (B), and the ethylene/polar monomer copolymer (D) in an amount of 5 to 100 parts by weight based on 100 parts by weight of the total of the ethylene/α-olefin copolymer (A) and the hydrogenated copolymer (B).

Preparation of Resin Composition

The resin composition of the present invention is a non-crosslinked and unfoamed composition, and it may be in a molten state or may be in the form of pellets or a sheet obtained by solidification by cooling.

The pellets of the resin composition of the present invention can be prepared by mixing the ethylene/α-olefin copolymer (A), the hydrogenated copolymer (B) obtained by hydrogenating a copolymer comprising a conjugated diene and a vinyl aromatic compound, and the blowing agent (E), preferably the ethylene/α-olefin copolymer (A), the hydrogenated copolymer (B) obtained by hydrogenating a copolymer comprising a conjugated diene and a vinyl aromatic compound, at least one resin (C) selected from the group consisting of rosin-based resins, terpene-based resins and petroleum resins, the ethylene/polar monomer copolymer (D), the blowing agent (E), and if necessary, the organic peroxide (F), the crosslinking assistant (G) and the blowing assistant, in the aforesaid amounts by a Henschel mixer or the like, then plasticizing by melting the mixture by a kneading machine, such as Banbury mixer, roll or extruder, at a temperature at which the blowing agent (E) and/or the organic peroxide (F) are not decomposed, then uniformly dispersing the resulting composition and pelletizing it by the use of a pelletizing machine.

In addition to the above components, various additives, such as filler, heat stabilizer, weathering stabilizer, flame retardant, hydrochloric acid absorbent and pigment, may be added to the resin composition when needed, within limits not detrimental to the object of the present invention.

The sheet of the resin composition of the present invention can be prepared by, for example, subjecting the pellets of the resin composition obtained as above to extrusion or calendering by the use of an extruder or a calender molding machine, or after the components of the resin composition are kneaded by a Branbender mill or the like, the kneadate is calendered into a sheet by a calender roll or press-molded into a sheet by a press molding machine or kneaded by an extruder, and then passed through a T-die or a circular die to mold a sheet, whereby a foamable sheet in an unfoamed state can be prepared.

Foam

The foam of the present invention is obtained by foaming or crosslinking-foaming such a resin composition of the present invention as above under the conditions of usually 130 to 200° C., 30 to 300 kgf/cm$^2$ and 10 to 90 minutes. The (crosslinking) foaming time depends upon the thickness of the mold, so that it can be properly controlled out of this range.

The foam or the crosslinked foam of the present invention may be a foam that is obtained by subjecting the foam or the crosslinked foam obtained under the above conditions to compression molding under the conditions of 130 to 200° C., 30 to 300 kgf/cm$^2$, 5 to 60 minutes and a compression ratio of 1.1 to 3, preferably 1.3 to 2.

The foam or the crosslinked foam has a specific gravity (JIS K7222) of not more than 0.6, preferably 0.03 to 0.25, more preferably 0.05 to 0.25, and a surface hardness (Asker C hardness) of 20 to 80, preferably 30 to 65. The crosslinked foam has a gel fraction of desirably not less than 70% and usually 70 to 95%.

The foam, particularly crosslinked foam, of the present invention having such properties has characteristics of low compression set, high tear strength and excellent vibration-damping properties.

The gel fraction (gel content, xylene-insoluble fraction) is measured in the following manner.

That is to say, a sample of the crosslinked foam is weighed and cut into fine fragments. Then, the resulting fine fragments are placed together with p-xylene in a closed container, and p-xylene is refluxed at atmospheric pressure for 3 hours.

Then, the sample is taken out on a filter paper and absolutely dried. From the weight of the dry residue, the weight of xylene-insoluble components other than the polymer component (e.g., filler, bulking agent, pigment) is subtracted, and the resulting value is regarded as "collected final weight (Y)".

On the other hand, from the weight of the sample, the weight of xylene-soluble components other than the polymer component (e.g., stabilizer) and the weight of xylene-insoluble components other than the polymer component (e.g., filler, bulking agent, pigment) are subtracted, and the resulting value is regarded as "collected initial weight (X)".

The gel content (xylene-insoluble fraction) is determined by the following formula.

$$\text{Gel content (wt \%)} = (\text{"Collected final weight } (Y)\text{"} \div \text{"Collected initial weight } (X)\text{"}) \times 100$$

The foam of the present invention has a peak temperature of tan δ, as determined in the dynamic viscoelasticity measurement, of preferably 0 to 60° C., more preferably 20 to 60° C., still more preferably 30 to 60° C. The tan δ was measured in the following manner. From a sample of the resulting secondary-crosslinked foam, a cube 10 mm in length, 10 mm in width and 10 mm in height was cut out, and the tan δ of the cube was measured using RAS-II manufactured by Rheometrics Inc. The measurement was carried out in a nitrogen atmosphere using a probe having a diameter of 10 mm under the conditions of a preset strain of 0.5%, a heating rate of 2° C./min, a temperature range of −20° C. to 60° C. and a frequency of 1 Hz, whereby a loss tangent tan δ at each temperature and a storage elastic-modulus G' were obtained. The measurement was carried out every degree centigrade.

In the case where plural peaks of tan δ are present between −20° C. to 60° C., the highest peak among them is regarded as a peak temperature of tan δ in the preferred range of the present invention.

Preparation of Foam

The foam (non-crosslinked or crosslinked foam) of the present invention can be prepared by, for example, the following process.

The sheet of the resin composition of the present invention can be obtained by molding, for example, the mixture previously described in the paragraph "Preparation of resin composition" using a calender molding machine, a press molding machine or a T-die extruder. This sheet molding is preferably carried out at a temperature of not higher than the decomposition temperatures of the blowing agent (E) and the organic peroxide (F), and specifically, the sheet molding is preferably carried out under such conditions that the temperature of the resin composition in a molten state becomes 100 to 130° C.

The sheet of the resin composition obtained as above is cut into a volume of 1.0 to 1.2 based on the volume of the mold and placed in a mold maintained at a temperature of 130 to 200° C. Then, a primary foam (non-crosslinked or crosslinked foam) is prepared under the conditions of a mold clamping pressure of 30 to 300 kgf/cm$^2$ and a holding time of 10 to 90 minutes. The (crosslinking) time depends upon the thickness of the mold, so that it can be properly controlled out of this range.

Although the shape of the mold for (crosslinking) foaming is not specifically restricted, a mold having a shape capable of providing a sheet is usually used. This mold preferably has a completely closed structure so that a molten resin and a gas generated when the blowing agent are decomposed should not escape. As the mold, a mold having a tapered inner surface is preferable from the viewpoint of mold releasability of the resin.

The primary foam obtained by the above process is then subjected to compression molding to impart a given shape to the foam.

This compression molding is carried out under the conditions of a mold temperature of 130 to 200° C., a clamping pressure of 30 to 300 kgf/cm$^2$, a compression time of 5 to 60 minutes and a compression ratio of 1.1 to 3.0.

In order to obtain a crosslinked foam by a crosslinking method using irradiation with an ionizing radiation, first, the ethylene/α-olefin copolymer (A), the hydrogenated copolymer (B) obtained by hydrogenating a copolymer comprising a conjugated diene and a vinyl aromatic compound, at least one resin (C) selected from the group consisting of rosin-based resins, terpene-based resins and petroleum resins, the ethylene/polar monomer copolymer (D), an organic thermal decomposition type blowing agent as the blowing agent (E) and other additives are melt-kneaded at a temperature lower than the decomposition temperature of the organic thermal decomposition type blowing agent, and the resulting kneadate is molded into, for example, a sheet, whereby a foamable sheet is obtained.

Then, the resulting foamable sheet is irradiated with an ionizing radiation in a given dose to crosslink the ethylene/α-olefin copolymer (A), the hydrogenated copolymer (B) obtained by hydrogenating a copolymer comprising a conjugated diene and a vinyl aromatic compound, at least one resin (C) selected from the group consisting of rosin-based resins, terpene-based resins and petroleum resins, and the ethylene/polar monomer copolymer (D), and thereafter, the resulting foamable crosslinked sheet is heated to a temperature of not lower than the decomposition temperature of the organic thermal decomposition type blowing agent to perform foaming, whereby a crosslinked foamed sheet can be obtained.

Examples of the ionizing radiations used herein include α-rays, β-rays, γ-rays, electron rays, neutron rays and X-rays. Of these, γ-rays of cobalt-60 and electron rays are preferably employed.

Examples of shapes of the foam articles include sheet, thick board, net and shaped articles.

From the crosslinked foam obtained as above, a secondary-crosslinked foam having the aforesaid properties can be prepared in the same manner as in the aforesaid process for preparing a secondary foam.

Laminate

The laminate of the present invention is a laminate having a layer comprising the foam (non-crosslinked or crosslinked foam) of the present invention and a layer comprising at least one material selected from the group consisting of a polyolefin, a polyurethane, a rubber, a leather and a synthetic leather.

There is no specific limitation on the polyolefin, the polyurethane, the rubber, the leather and the synthetic leather, and any of hitherto publicly known polyolefin, polyurethane, rubber, leather and synthetic leather is employable. Such a laminate is particularly suitable for footwear and footwear parts.

Footwear and Footwear Part

The footwear and the footwear part of the present invention comprise the foam (non-crosslinked or crosslinked foam) of the present invention or the laminate of the present invention. Examples of the footwear parts include shoe soles, shoe midsoles, inner soles, soles and sandals and the like.

EXAMPLES

The present invention is further described with reference to the following examples, but it should be construed that the present invention is in no way limited to those examples.

Density, MFR, B value, Tαβ intensity ratio and molecular weight distribution (Mw/Mn) of the ethylene/1-butene copolymer used in the examples and the comparative examples, and specific gravity, compression set, tear strength, Asker C hardness (surface hardness) and impact resilience of the crosslinked foams obtained in the examples and the comparative examples were measured in accordance with the following methods.

Evaluation of properties of ethylene/1-butene copolymer (1) Density

The density was determined at 23° C. in accordance with ASTM 1505.

(2) MFR

The MFR was determined at 190° C. in accordance with ASTM D1238. A measured value under a load of 2.16 kg is indicated by MFR2, and a measured value under a load of 10 kg is indicated by MFR10.

(3) B Value, Tαβ Intensity Ratio

These values were determined by $^{13}$C-NMR.

(4) Molecular Weight Distribution (Mw/Mn)

The molecular weight distribution was determined by a gel permeation chromatograph using an orthodichlorobenzene solvent at 140° C. The measurement was carried out in the following manner using a gel permeation chromatograph Alliance GPC-2000 Model manufactured by Waters Co. As separatory columns, two TSKgel GNH6-HT and two TSKgel GNH6-HTL were used, and each of them had a column size of a diameter of 7.5 mm and a length of 300 mm. The column temperature was set at 140° C. Using o-dichlorobenzene (available from Wako Pure Chemical Industries, Ltd.) as a mobile phase and 0.025% by weight of BHT (available from Takeda Pharmaceutical Co., Ltd.) as an antioxidant, the sample was moved at a rate of 1.0 ml/min. The sample concentration was 15 mg/10 ml, and an injection of the sample was 500 microliters. As a detector, a differential refractometer was used. As standard polystyrene having a molecular weight of Mw<1000 and having a molecular weight of Mw>4×10$^6$, those available from Tosoh Corporation were used, and as standard polystyrene having a molecular weight of 1000≤Mw≤4×10$^6$, polystyrene available from Pressure Chemical Co. was used.

(5) Glass Transition Point

The glass transition point was determined at a frequency of 1 Hz in accordance with JIS-K7198.

Evaluation of Properties of Crosslinked Foam (1) Specific Gravity

The specific gravity was measured in accordance with JIS K7222.

(2) Compression Set

A compression set test was carried out under the conditions of 50° C.×6 hours and a compression percentage of 50% in accordance with JIS K6301 to determine a compression set (CS).

(3) Tear Strength

A tear strength test was carried out under the conditions of a tensile rate of 10 mm/min in accordance with BS5131-2.6 to determine a tear strength.

(4) Asker C Hardness

The Asker C hardness was measured in accordance with "Spring Hardness Test Type C Test Method" described in JIS K7312-1996 Annex 2.

(5) Impact Resilience

An iron ball of 15 g was dropped from the height of 50 cm (=LO), and a height of rebound (=L) of the iron ball was measured at 23° C. and 40° C. The impact resilience was determined by the following formula.

Impact resilience (%)=$L/LO$×100

(6) Adhesive Strength of Laminate

A press-bonded sheet was prepared in the following manner, and a peel test was carried out to measure an adhesive strength.

Treatment of Secondary-Crosslinked Foam

First, a surface of a secondary-crosslinked foam was washed with water containing a surface active agent and dried at room temperature for 1 hour. Then, the secondary-crosslinked foam was immersed in methylcyclohexane for 3 minutes and then dried in an oven at 60° C. for 3 minutes.

Subsequently, the secondary-crosslinked foam was coated with an UV-curable primer (available from Great Eastern Resins Co., Ltd., GE258H1) thinly by brushing and dried in an oven at 60° C. for 3 minutes. Thereafter, an irradiation device (manufactured by Japan Storage Buttery Co., Ltd., EPSH-600-3S Model, UV irradiation device), in which 3 high-pressure mercury lamps of 80 W/cm were equipped perpendicularly to the passing direction, was used as a light source, and the secondary-crosslinked foam was placed at the position of 15 cm below the light source, followed by moving a conveyor at a speed of 10 m/min to irradiate the secondary-crosslinked foam with an UV light.

Thereafter, the secondary-crosslinked foam was coated with an auxiliary primer (primer obtained by adding 5% by weight of a curing agent "GE366S" to a primer "GE6001L" available from Great Eastern Resins Co., Ltd.) thinly by brushing and dried in an oven at 60° C. for 3 minutes.

Subsequently, the secondary-crosslinked foam was coated with an adhesive (adhesive obtained by adding 4% by weight of a curing agent "GE348" to an adhesive "98H" available from Great Eastern Resins Co., Ltd.) thinly by brushing and dried in an oven at 60° C. for 5 minutes.

Finally, the secondary-crosslinked foam having been coated with the adhesive and a polyurethane (PU) synthetic leather sheet having been subjected the following treatment were laminated and press-bonded at 20 kg/cm² for 10 seconds.

Treatment of PU Synthetic Leather Sheet

A surface of a PU synthetic leather sheet was washed with methyl ethyl ketone and dried at room temperature for 1 hour.

Then, the PU synthetic leather sheet was coated with an auxiliary primer (primer obtained by adding 5% by weight of a curing agent "GE366S" to a primer "GE6001L" available from Great Eastern Resins Co., Ltd.) thinly by brushing and dried in an oven at 60° C. for 3 minutes.

Subsequently, the PU synthetic leather sheet was coated with an adhesive (adhesive obtained by adding 4% by weight of a curing agent "GE348" to an adhesive "98H" available from Great Eastern Resins Co., Ltd.) thinly by brushing and dried in an oven at 60° C. for 5 minutes.

Peeling Test

After 24 hours, the adhesive strength of the press-bonded sheet was evaluated in the following manner.

That is to say, the press-bonded sheet was cut into a width of 1 cm, and the edge thereof was peeled and pulled at a rate of 200 mm/min in the direction of 1800 to measure a peel strength. The number of samples was 5, and the adhesive strength shown in Table 2 is a mean value thereof. Further, the state of peeling was observed with the naked eye.

The hydrogenated copolymer obtained by hydrogenating a copolymer comprising a conjugated diene and a vinyl aromatic compound, which is used in the examples, is as follows.

(1) Hydrogenated Copolymer (B-1) Obtained by Hydrogenating Copolymer Comprising Conjugated Diene and Vinyl Aromatic Compound S.O.ER-SS SS9000 (available from Asahi Kasei Corporation)

Density (ASTM D1505, 23° C.): 0.99 g/cm³

Melt flow rate (ASTM D1238, load of 2.16 kg, 230° C.): 2.7 g/10 min

Glass transition point: 9° C.

The natural resin such as a rosin-based or terpene-based resin or the petroleum resin used in the examples is as follows.

(2) Petroleum Resin (C-1)

Alkon M-115 (available from Arakawa Chemical Industries, Ltd.)

Softening point: 115° C.

The ethylene/polar monomer copolymer used in the examples is as follows.

(3) Ethylene/Vinyl Acetate Copolymer (D-1)

EV460 (available from DuPont-Mitsui Polychemical Co., Ltd.)

Vinyl acetate content: 19% by weight

Density (ASTM D1505, 23° C.): 0.94 g/cm³

Melt flow rate (MFR2) (ASTM D1238, load of 2.16 kg, 190° C.): 2.5 g/10 min (4) Styrene/Butadiene/Styrene Block Copolymer (S-1)

Tufpren 125 (available from Asahi Kasei Corporation)

Styrene content: 40% by weight

Density (ASTM D1505, 23° C.): 0.95 g/cm³

Melt flow rate (MFR2) (ASTM D1238, load of 2.16 kg, 190° C.): 4.5 g/10 min

Glass transition point: −78° C., 96° C.

Preparation Example 1

Preparation of Catalyst Solution

To 18.4 mg of triphenylcarbenium(tetrakispentafluorophenyl) borate, 5 ml of toluene was added to dissolve it, whereby a toluene-solution having a concentration of 0.004 mmol/ml was prepared. Then, to 1.8 mg of [dimethyl(t-butylamide)(tetramethyl-$\eta^5$-cyclopentadienyl)silane]titanium dichloride, 5 ml of toluene was added to dissolve it, whereby a toluene solution having a concentration of 0.001 mmol/ml was prepared. At the time of polymerization initiation, to 0.38 ml of the toluene solution of triphenylcarbenium(tetrakispentafluorophenyl) borate and 0.38 ml of the toluene solution of [dimethyl(t-butylamide)(tetramethyl-$\eta^5$-cyclopentadienyl)silane]titanium dichloride, 4.24 ml of toluene for dilution was added, whereby 5 ml of a toluene solution having a triphenylcarbenium(tetrakispentafluorophenyl) borate content of 0.002 mmol/L in terms of B and a [dimethyl(t-butylamide)(tetramethyl-$\eta^5$-cyclopentadienyl)silane]titanium dichloride content of 0.0005 mmol/L in terms of Ti was prepared.

Preparation of Ethylene/1-Butene Copolymer (A-1)

In a 1.5-liter SUS autoclave equipped with a stirring blade, which had been thoroughly purged with nitrogen, 750 ml of heptane was placed at 23° C. To the autoclave, 10 g of 1-butene and 120 ml of hydrogen were fed with rotating the stirring blade and with ice cooling. Then, the autoclave was heated to 100° C. and pressurized with ethylene so that the total pressure should become 6 kgf/cm². When the internal pressure of the autoclave became 6 kgf/cm², 1.0 ml of a hexane solution of triisobutylaluminum (TIBA) (1.0 mmol/ml) was forced into the autoclave with nitrogen. Subsequently, 5 ml of the catalyst solution prepared above was forced into the autoclave with nitrogen to initiate polymerization. For a period of 5 minutes after that, temperature control of the autoclave was carried out so that the internal temperature should become 100° C., and ethylene was directly fed so that the pressure should become 6 kgf/cm². After 5 minutes from the polymerization initiation, 5 ml of methanol was introduced into the autoclave by means of a pump to terminate the polymerization, and pressure release from the autoclave was carried out until atmospheric pressure was reached. To the reaction solution, 3 liters of methanol was poured with stirring. The resulting polymer containing the solvent was dried at 130° C. for 13 hours at 600 Torr to obtain 10 g of an ethylene/butene copolymer A-1. Properties of the resulting ethylene/1-butene copolymer are set forth in Table 1.

TABLE 1

| Polymer properties | Prep. Ex. 1<br>Ethylene/1-butene copolymer A-1 |
|---|---|
| Density (kg/m³) | 885 |
| Melt flow rate | 1.2 |
| Mw/Mn | 2.1 |
| MFR10/MFR2 | 10.0 |
| B value | 1.0 |
| T α β/T α α | 0.3 |

Example 1

A mixture of 80 parts by weight of the ethylene/1-butene copolymer (A-1), 20 parts by weight of the hydrogenated copolymer (B-1) obtained by hydrogenating a copolymer comprising a conjugated diene and a vinyl aromatic compound, 3.0 phr (weight percentage, i.e., 3.0 parts by weight based on 100 parts by weight of the total of (A-1) and (B-1)) of zinc oxide, 0.7 phr (weight percentage, i.e., 0.7 part by weight based on 100 parts by weight of the total of (A-1) and (B-1)) of dicumyl peroxide (DCP), 0.12 phr (weight percentage, i.e., 0.12 part by weight based on 100 parts by weight of the total of (A-1) and (B-1)) (as TAIC content) of triallyl isocyanurate (TAIC) [trade name: M-60 (TAIC content: 60%), available from Nippon Kasei Chemical Co., Ltd.], 0.3 phr (weight percentage, i.e., 0.3 part by weight based on 100 parts by weight of the total of (A-1) and (B-1)) of 1,2-polybutadiene, and 3.8 phr (weight percentage, i.e., 3.8 parts by weight based on 100 parts by weight of the total of (A-1) and (B-1)) of azodicarbonamide was kneaded by a kneader at a preset temperature of 100° C. for 10 minutes, then further kneaded by a roll at a roll surface temperature of 100° C. for 10 minutes and then molded into a sheet.

As understood from the above, the term "X phr" used in the examples means that it is used in an amount of X part(s) by weight based on 100 parts by weight of the total of the component (A), the component (B), the component (C) that is added when needed, and the component (D) that is added when needed.

The resulting sheet was placed in a pressure mold and then pressed and heated under the conditions of 150 kg/cm², 155° C. and 30 minutes to obtain a primary crosslinked foam. This press mold had a size of a thickness of 15 mm, a length of 150 mm and a width of 200 mm.

Then, the primary crosslinked foam was subjected to compression molding under the conditions of 150 kg/cm², 155° C. and 10 minutes to obtain a secondary-crosslinked foam. The resulting secondary-crosslinked foam had a size of a thickness of 15 mm, a length of 160 mm and 250 mm.

Then, specific gravity, compression set, tear strength, Asker C hardness and impact resilience of the secondary-crosslinked foam were measured in accordance with the aforesaid methods. Further, adhesive strength of the laminate comprising the foam and the polyurethane (PU) synthetic leather sheet was measured in accordance with the aforesaid method, and the state of peeling of the laminate was observed with the naked eye. The results are set forth in Table 2.

Example 2

A secondary-crosslinked foam was prepared in the same manner as in Example 1, except that the amount of the ethylene/1-butene copolymer (A-1) was changed to 90 parts by weight from 80 parts by weight, the amount of the hydrogenated copolymer (B-1) obtained by hydrogenating a copolymer comprising a conjugated diene and a vinyl aromatic compound was changed to 10 parts by weight from 20 parts by weight, the petroleum resin (C-1) was added in an amount of 10 parts by weight based on 100 parts by weight of the total of (A-1) and (B-1), and the amount of the azodicarbonamide was changed to 2.7 phr (weight percentage) from 3.8 phr (weight percentage). Then, property measurements were carried out in the same manner as in Example 1. The results are set forth in Table 2.

Example 3

A secondary-crosslinked foam was prepared in the same manner as in Example 1, except that the amount of the ethylene/1-butene copolymer (A-1) was changed to 90 parts by weight from 80 parts by weight, the amount of the hydrogenated copolymer (B-1) obtained by hydrogenating a copolymer comprising a conjugated diene and a vinyl aromatic compound was changed to 10 parts by weight from 20 parts by weight, the petroleum resin (C-1) was added in an amount of 10 parts by weight based on 100 parts by weight of the total of (A-1) and (B-1), the ethylene/vinyl acetate copolymer (D-1) was added in an amount of 10 parts by weight based on 100 parts by weight of the total of (A-1) and (B-1), and the amount of the azodicarbonamide was changed to 2.7 phr (weight percentage) from 3.8 phr (weight percentage). Then, property measurements were carried out in the same manner as in Example 1. The results are set forth in Table 2.

Comparative Example 1

A secondary-crosslinked foam was prepared in the same manner as in Example 1, except that the amount of the ethylene/1-butene copolymer (A-1) was changed to 100 parts by weight from 80 parts by weight, the amount of the hydrogenated copolymer (B-1) obtained by hydrogenating a copolymer comprising a conjugated diene and a vinyl aromatic compound was changed to 0 part by weight from 20 parts by weight, and the amount of the azodicarbonamide was changed to 4.0 phr (weight percentage) from 3.8 phr (weight percentage). Then, property measurements were carried out in the same manner as in Example 1. The results are set forth in Table 2.

Comparative Example 2

A secondary-crosslinked foam was prepared in the same manner as in Example 1, except that the amount of the ethylene/1-butene copolymer (A-1) was changed to 0 part by weight from 80 parts by weight, the amount of the hydrogenated copolymer (B-1) obtained by hydrogenating a copolymer comprising a conjugated diene and a vinyl aromatic compound was replaced with 20 parts by weight of the styrene/butadiene/styrene block copolymer (S-1), and the amount of the azodicarbonamide was changed to 4.0 phr (weight percentage) from 3.8 phr (weight percentage). Then, property measurements were carried out in the same manner as in Example 1. The results are set forth in Table 2.

TABLE 2

|  |  | Ex. 1 | Ex. 2 | Ex. 3 | Comp. Ex. 1 | Comp. Ex. 2 | Comp. Ex. 3 |
|---|---|---|---|---|---|---|---|
| Resin (part(s) by weight) | | | | | | | |
| EBR | A-1 | 80 | 90 | 90 | 100 | | 80 |
| SS-9000 | B-1 | 20 | 10 | 10 | | | |
| M-115 | C-1 | | | 10 | 10 | | |
| EVA | D-1 | | | | 10 | 100 | |
| SBS | S-1 | | | | | | 20 |
| Additive (phr/weight percentage) | | | | | | | |
| ZnO | | | | | 3.0 | | |
| St/A | | | | | 1.0 | | |
| TiO$_2$ | | | | | 3.0 | | |
| DCP | | | | | 0.70 | | |
| TAIC M60 | | | | | 0.20 | | |
| 1,2-polybutadiene | | | | | 0.30 | | |
| ADCA(AC #3) | | 3.8 | 2.7 | 2.7 | 4.0 | 4.0 | 4.0 |
| Properties (150% Compression) | | | | | | | |
| Hardness | Primary foaming | 29 | 30 | 30 | 27 | 32 | 29 |
|  | Secondary compression | 47 | 47 | 48 | 45 | 51 | 49 |
| Specific gravity | Primary foaming | 0.11 | 0.11 | 0.11 | 0.11 | 0.11 | 0.12 |
|  | Secondary compression | 0.14 | 0.15 | 0.14 | 0.14 | 0.15 | 0.14 |
| Compression set | % | 56 | 58 | 60 | 58 | 65 | 56 |
| Tear strength | N/cm | 78 | 83 | 75 | 81 | 62 | 84 |
| Impact resilience (23° C.) | % | 49 | 46 | 45 | 64 | 48 | 62 |
| Impact resilience (40° C.) | % | 39 | 35 | 35 | 59 | 44 | 56 |
| Peak temp. of tan δ | ° C. | 13 | 32 | 30 | Not detected | Not measured | Not measured |
| Adhesive strength | N/cm | 2.8 | 2.7 | 2.8 | 2.9 | 1.9 | 2.9 |
| State of peeling | | Partial interfacial peeling (*) | Partial interfacial peeling (*) | Material fracture of foam | Partial interfacial peeling (*) | Material fracture of foam | Partial Interfacial peeling (*) |

(*) Peeling occurred from the interface between the foam layer and the PU synthetic leather layer in the laminate.

mer comprising a conjugated diene and a vinyl aromatic compound was changed to 0 part by weight from 20 parts by weight, the ethylene/vinyl acetate copolymer (D-1) was added in an amount of 100 parts by weight, and the amount of the azodicarbonamide was changed to 4.0 phr (weight percentage) from 3.8 phr (weight percentage). Then, property measurements were carried out in the same manner as in Example 1. The results are set forth in Table 2.

Comparative Example 3

A secondary-crosslinked foam was prepared in the same manner as in Example 1, except that 20 parts by weight of the hydrogenated copolymer (B-1) obtained by hydrogenating a copolymer comprising a conjugated diene and a vinyl aro-

INDUSTRIAL APPLICABILITY

According to the present invention, foams (non-crosslinked and crosslinked foams) which have low specific gravity and low compression set (CS) and are excellent in tensile strength properties, tear strength properties and vibration-damping properties at room temperature to high temperatures can be provided.

The invention claimed is:
1. A resin composition for foams, comprising 80 to 95 parts by weight of an ethylene/α-olefin copolymer (A) and 5 to 20 parts by weight of a hydrogenated copolymer (B) obtained by hydrogenating a copolymer consisting of a conjugated diene and a vinyl aromatic compound, wherein the hydrogenated copolymer (B) does not have a glass transition point equal to or lower than −10° C. when measured at a frequency of 1 Hz in accordance with JIS-K7198, and 5 to 50 parts by weight of at least one resin (C) selected from the group consisting of rosin-based resins, terpene-based resins and petroleum resins and/or 5 to 100 parts by weight of an ethylene/polar monomer copolymer (D) based on 100 parts by weight of the total of the ethylene/α-olefin copolymer (A) and the hydrogenated copolymer (B).

2. The resin composition for foams as claimed in claim 1, wherein the resin (C) has a softening point, as measured by a ring and ball method, of 40 to 180° C.

3. The resin composition for foams as claimed in claim 1, which further comprises a blowing agent (E).

4. The resin composition for foams as claimed in claim 1, wherein the ethylene/α-olefin copolymer (A) has the following properties:

the ethylene/α-olefin copolymer (A) is an ethylene/α-olefin copolymer comprising ethylene and an α-olefin of 3 to 20 carbon atoms and has a density (ASTM D1505, 23° C.) of 0.857 to 0.910 g/cm$^3$, a melt flow rate (MFR2) (ASTM D 1238, load of 2.16 kg, 190° C.), as measured at 190° C. under a load of 2.16 kg, of 0.1 to 40 g/10 min and a molecular weight distribution index, Mw/Mn, as evaluated by a GPC method, of 1.5 to 3.0.

5. A foam obtained by heat-treating the resin composition of claim 1.

6. A foam obtained by subjecting the foam of claim 5 to secondary compression.

7. The foam as claimed in claim 5, which has a peak temperature of tan δ, as determined in the dynamic viscoelasticity measurement, of 0 to 60° C.

8. The foam as claimed in claim 5, which has a gel content of not less than 70% and a specific gravity of not more than 0.6.

9. A laminate having a layer comprising the foam of claim 5 and a layer comprising at least one material selected from the group consisting of a polyolefin, a polyurethane, a rubber, a leather and a synthetic leather.

10. Footwear comprising the foam of claim 5.

11. A footwear part comprising the foam of claim 5.

12. The footwear part as claimed in claim 11, which is a midsole, an inner sole or a sole.

13. Footwear comprising the laminate of claim 9.

14. A footwear part comprising the laminate of claim 9.

* * * * *